Nov. 24, 1953  R. H. SHADDOX  2,660,280
AUTOMATIC FRICTION TYPE CLUTCH
Filed Oct. 20, 1950  2 Sheets-Sheet 1
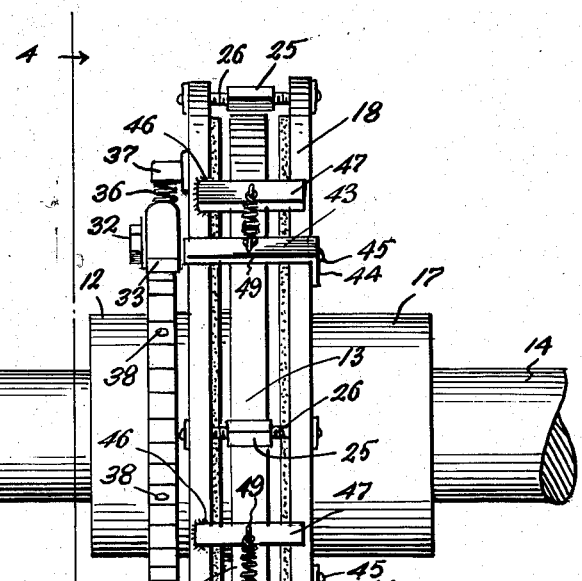
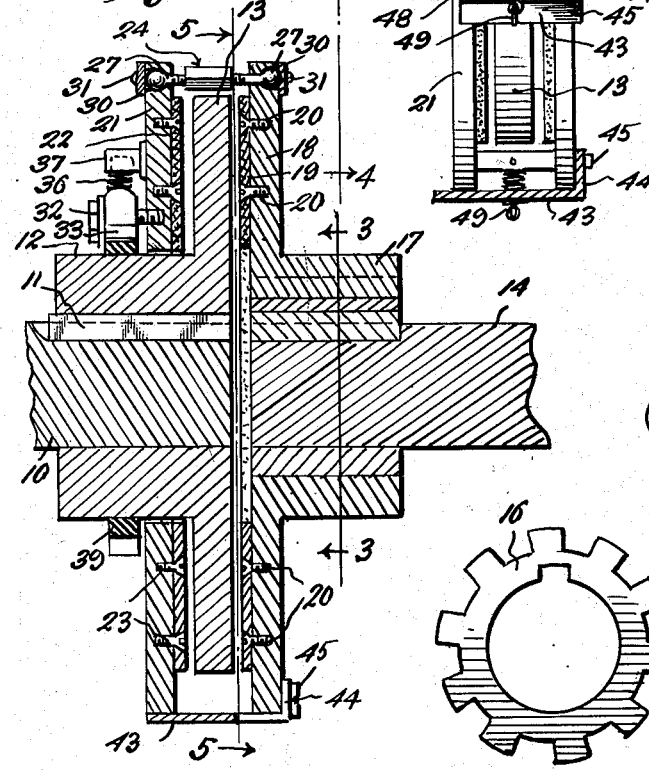
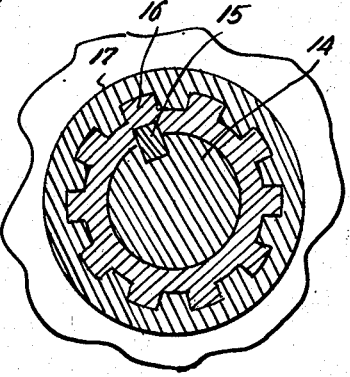
INVENTOR.
ROBERT H. SHADDOX
BY
Patrick D. Beaver
ATTORNEY

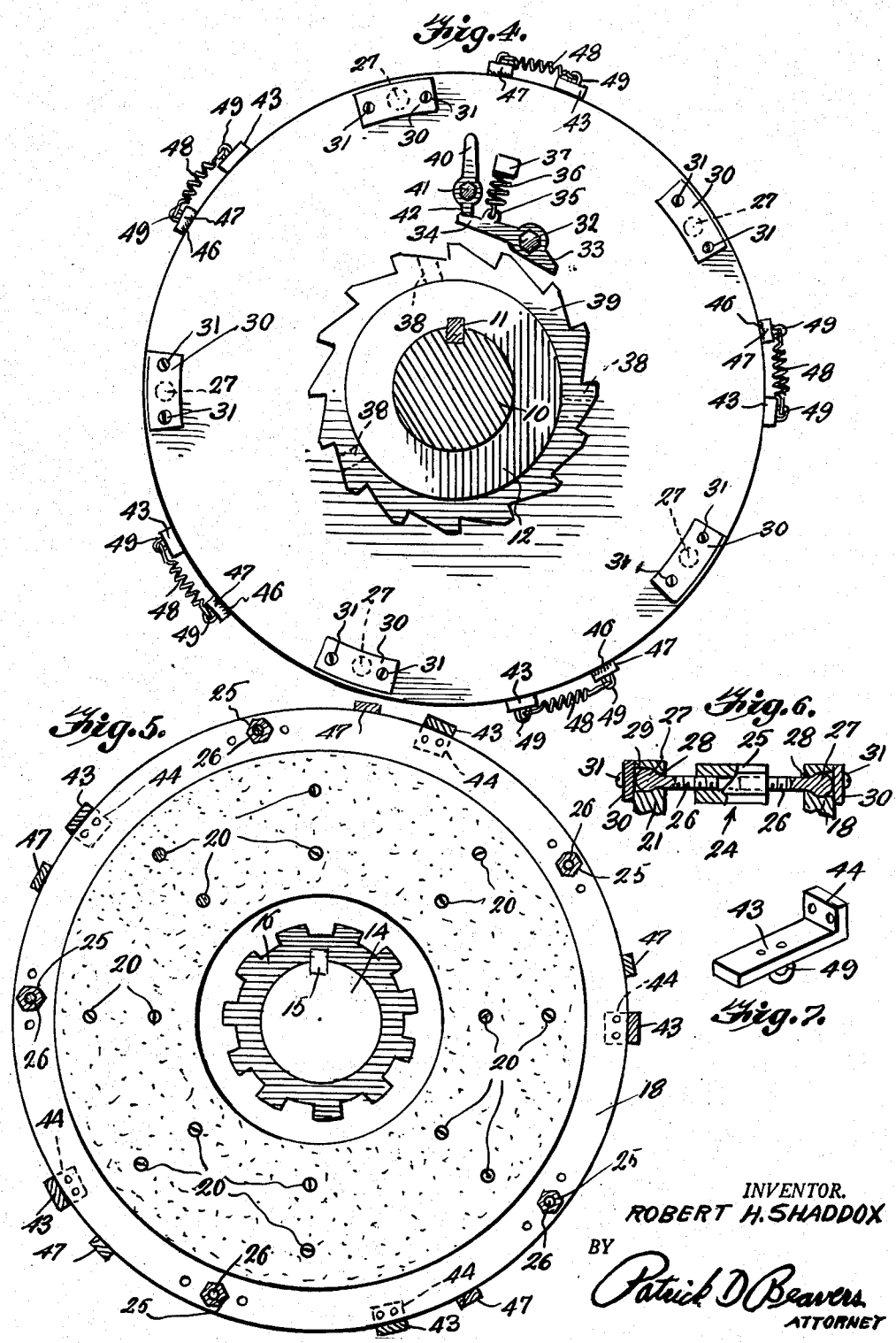

Patented Nov. 24, 1953

2,660,280

UNITED STATES PATENT OFFICE 2,660,280

AUTOMATIC FRICTION TYPE CLUTCH

Robert H. Shaddox, Corpus Christi, Tex.

Application October 20, 1950, Serial No. 191,148

4 Claims. (Cl. 192—68)

The present invention relates to an automatic friction type clutch and it consists in the combinations, constructions and arrangements of parts herein described and claimed.

Generally there is provided an automatic friction type clutch wherein a drive shaft is provided with a central clutch plate having clutching surfaces on either side thereof and which is attached to the drive shaft by keying or otherwise. This central clutch is provided with a collar upon which is affixed a ratchet ring. A driven shaft has splined thereon a hub which carries a reciprocal clutch plate having a friction surface facing one side of the central clutch plate and connected by a series of pivoted toggle bolts or spreader jacks to a floating clutch plate likewise provided with a friction surface facing the other face of the central clutch plate. The last mentioned floating clutch plate carries upon its outer side a pawl which may be engaged or disengaged with the ratchet wheel by means of a lever also mounted upon such floating friction plate. A series of stop members is carried by each of the floating clutch plate and reciprocal clutch plate and each of the stop members of one series is connected with a stop member of the other series by means of a tension spring. Movement of the drive shaft in one direction, while the pawl is engaged with the ratchet ring, will cause a corresponding movement of the driven shaft by forcing the floating clutch plate and reciprocal clutch plate into engagement with the central clutch plate through the action of the toggle bolts. Release of the pawl from the ratchet ring will allow the springs above referred to to bring the stop members together and, through the action of the toggle bolts, force the floating clutch plate and reciprocal clutch plate away from the central clutch plate thereby allowing free movement of the driven shaft with respect to the drive shaft in either direction. The device is particularly adaptable to the synchronization of compound driving units.

It is accordingly an object of the invention to provide a device of the character set forth which is simple in its construction, comparatively inexpensive to manufacture and yet effective and efficient in use.

Another object of the invention is the provision of a novel arrangement of a fixed dual-faced clutch plate with a pair of outer clutch plates.

Another object of the invention is the provision, in a device of the character set forth, of novel means for controlling the action of clutch plates forming a part of the invention.

A further object of the invention is the provision, in a device of the character set forth, of novel stop members and spreader jacks both forming parts of the invention.

Other and further objects of the invention will become apparent from a reading of the following specification taken in conjunction with the drawings, in which:

Figure 1 is a side elevational view of an embodiment of the invention,

Figure 2 is a vertical sectional view of Figure 1,

Figure 3 is a sectional view taken along line 3—3 of Figure 2,

Figure 4 is a sectional view taken along line 4—4 of Figure 1,

Figure 5 is a sectional view taken along line 5—5 of Figure 2,

Figure 6 is an enlarged fragmentary sectional view, partly broken away, illustrating the details of construction of a toggle bolt or spreader jack forming a part of the invention, Figure 7 is a perspective view of a stop member forming a part of the invention, and Figure 8 is an end elevational view of a spline utilized in the invention.

Referring more particularly to the drawings, there is shown therein a drive shaft 10 to which is splined, as indicated at 11, a hub 12 of a central clutch plate 13. There is also provided a driven shaft 14 which is in axial alignment with the drive shaft 10.

There is affixed to the driven shaft 14 as by a key 15 a spline collar 16 upon which is splined for longitudinal movement a hub 17 having integrally formed therewith a reciprocal clutch plate 18 whose face adjoining the central clutch plate 13 is provided with a fibrous lining 19 which is attached thereto by means of screws 20 whose heads are countersunk in the lining material. Adjacent the other face of the central clutch plate 13 is a floating clutch plate 21 whose face adjoining the central clutch plate 13 is likewise provided with a fibrous lining material 22 which is held thereon by means of screws 23.

The clutch plates 18 and 21 are interconnected by a series of spreader jacks generally indicated at 24 in Figure 6 of the drawings. Each of the spreader jacks comprises a turnbuckle 25 in either end of which is threaded a bolt 26 having a head 27 at its free end. Each of the bolts 26 extends through a relatively narrow opening 28 in its associated clutch plate and the head thereof lies within a relatively larger opening 29 the outer side of which is sealed by a plate 30 which is held thereon by means of screws 31 or the like.

In the present case five of such spreader jacks are shown.

To a pin 32 extending outwardly from the outer side of the clutch plate 21 there is pivotally connected a pawl 33 which is provided with an integrally formed arm 34 having a dog 35 formed thereon which dog is connected by means of a tensioning spring 36 with an ear 37 likewise formed on the outer face of the clutch plate 21.

Affixed to the hub 12 by a plurality of radially extending set screws 38 is a ratchet ring 39, the teeth of which are adapted to be engaged by the pawl 33. A lever 40 is pivoted upon a pin 41 which extends from the outer face of the floating clutch plate 21 and is provided with an extension 42 which is adapted to engage the arm 34.

A plurality of support arms 43, in this case five in number are each provided with a foot 44 which extends perpendicularly thereto and which foot is affixed to the outer face of the clutch plate 18 by means of a screw 45 or the like. The free ends of each of the support arms 43 extend beyond the periphery of the clutch plate 21 and are in contact therewith to thereby support the same in concentric alignment with the clutch plate 18. Welded, as indicated at 46, in spaced relation to the periphery of the floating clutch plate 21 and extending in a direction to embrace the clutch plate 18 in a series of spaced stop arms 47, in this case likewise five in number and each of the support arms 43 is interconnected with its associated adjacent stop arm 47 by means of a tension spring 48. Eyes 49 are provided upon each of the arms 43 and each of the arms 47 for the purpose of fastening the tension spring 48 thereto.

In the operation of the device, it will be apparent that when the drive shaft 10 is in motion in a counterclockwise direction as viewed in Figure 4 and the pawl 33 is in engagement with the ratchet ring 39 and is being held in such engagement by means of the tensioning spring 36, that the counterclockwise motion of the shaft 10 will be imparted first to the floating clutch plate 21 which will then cause the spreader jacks 24 to move out of their longitudinal positions and thus cause both the clutch plates 18 and 21 to be brought into contact with the central clutch plate 13, the linings 19 and 22 at such time acting to grip the central clutch plate securely. When this occurs, it will be apparent that the clutch plates 21 and 18 together with the clutch plate 13 will rotate in a counterclockwise direction with the drive shaft 10 and hence that the driven shaft 14 will be forced to move in a counterclockwise direction also. As the jacks 24 are thus turned from their horizontal positions, it will be seen that the collar 17 will move longitudinally to the left as viewed in Figure 2 upon the spline 16.

When, however, the lever 40 is moved to the right, as viewed in Figure 4, it would be apparent that the extension 42 will move the arm 34 in a downward direction against the action of the spring 36, thus lifting the pawl 33 out of engagement with the teeth of the ratchet ring 39. When this occurs, the springs 48 will cause the arms 43 and 47 to be drawn toward each other until the spreader jacks 24 are again forced into horizontal positions, as viewed, for example in Figure 1 of the drawings, thus forcing the clutch plates 18 and 21 away from the central clutch plate 13 and hence the linings 19 and 22 out of engagement with such central clutch plate 13. In this condition, it will be apparent that such movement as heretofore described, namely the counterclockwise movement of the shaft 10 as indicated at Figure 4, will no longer be transmitted to the shaft 14 since in such condition there will be no physical connection whatever between the drive shaft 10 and the driven shaft 14.

Again, when the pawl 33 is engaged with the ratchet ring as aforesaid, it will be apparent that if counterclockwise movement is applied to the shaft 10 to thus cause the like counterclockwise movement of the shaft 14, as viewed in Figure 4, that any overriding movement that is to say any speed of the shaft 14 greater than the speed of the shaft 10 will merely cause the pawl 33 to override the teeth of the ratchet ring 39 and that when the speed of the driven shaft 14 again becomes lessened, the motion of the shaft 10 will again be imparted to the shaft 14.

While but one form of the invention has been shown and described herein, it will be readily apparent to those skilled in the art that many minor modifications may be made without departing from the spirit of the invention or the scope of the appended claims.

What is claimed is:

1. A device of the character described comprising a drive shaft, a driven shaft in axial alignment and adjacent to said drive shaft, a central dual-faced clutch plate affixed to said drive shaft, a collar splined upon the driven shaft, a reciprocal clutch plate affixed to said collar, a floating clutch plate surrounding the drive shaft upon the opposite side of said central clutch plate to said plate affixed to said collar, a plurality of circumferentially spaced support arms affixed to the periphery of the plate carried by the collar and extending beyond the floating clutch plate and in contact therewith, a plurality of stop arms affixed in spaced circumferential arrangement to the periphery of the plate surrounding the drive shaft and extending longitudinally to embrace the plate carried by the collar, a tension spring interconnecting each stop arm with its adjacent support arm, a plurality of circumferentially spaced spreader jacks interconnecting the floating clutch plate and the reciprocal clutch plate, and means for moving said floating clutch and said reciprocal clutch plate into and out of engagement with said central clutch plate.

2. A device of the character described comprising a drive shaft, a driven shaft in axial alignment and adjacent to said drive shaft, a central dual-faced clutch plate affixed to said drive shaft, a collar splined upon the driven shaft, a reciprocal clutch plate affixed to said collar, a floating clutch plate surrounding the drive shaft upon the opposite side of said central clutch plate to said plate affixed to said collar, a plurality of circumferentially spaced support arms affixed to the periphery of the plate carried by the collar and extending beyond the floating clutch plate and in contact therewith, a plurality of stop arms affixed in spaced circumferential arrangement to the periphery of the plate surrounding the drive shaft and extending longitudinally to embrace the plate carried by the collar, a tension spring interconnecting each stop arm with its adjacent support arm, a plurality of circumferentially spaced spreader jacks interconnecting the floating clutch plate and the reciprocal clutch plate, and means for moving said floating clutch plate and said reciprocal plate into and out of engagement with said central clutch plate, said means including a ratchet ring carried by said clutch plate, and a pawl carried by said clutch plate surrounding said drive shaft.

3. A device of the character described comprising a drive shaft, a driven shaft in axial alignment and adjacent to said drive shaft, a central dual-faced clutch plate affixed to said drive shaft, a collar splined upon the driven shaft, a reciprocal clutch plate affixed to said collar, a floating clutch plate surrounding the drive shaft upon the opposite side of said central clutch plate to said plate affixed to said collar, a plurality of circumferentially spaced support arms affixed to the periphery of the plate carried by the collar and extending beyond the floating clutch plate and in contact therewith, a plurality of stop arms affixed in spaced circumferential arrangement to the periphery of the plate surrounding the drive shaft and extending longitudinally to embrace the plate carried by the collar, a tension spring interconnecting each stop arm with its adjacent support arm, a plurality of circumferentially spaced spreader jacks interconnecting the floating clutch plate and the reciprocal clutch plate, means for moving said floating clutch plate and reciprocal clutch plate into and out of engagement with said central clutch plate, and means for inactivating said first-mentioned means.

4. A device of the character described comprising a drive shaft, a driven shaft in axial alignment and adjacent to said drive shaft, a central dual-faced clutch plate affixed to said drive shaft, a collar splined upon the driven shaft, a reciprocal clutch plate affixed to said collar, a floating clutch plate surrounding the drive shaft upon the opposite side of said central clutch plate to said plate affixed to said collar, a plurality of circumferentially spaced support arms affixed to the periphery of the plate carried by the collar and extending beyond the floating clutch plate and in contact therewith, a plurality of stop arms affixed in spaced circumferential arrangement to the periphery of the plate surrounding the drive shaft and extending longitudinally to embrace the plate carried by the collar, a tension spring interconnecting each stop arm with its adjacent support arm, a plurality of circumferentially spaced spreader jacks interconnecting the floating clutch plate and the reciprocal clutch plate, means for moving said floating clutch plate and said reciprocal clutch plate into and out of engagement with said central clutch plate, said means including a ratchet ring carried by said clutch plate, and a pawl carried by said clutch plate surrounding said drive shaft, and means for inactivating said first-mentioned means, said last-mentioned means including an arm formed integrally with said pawl, a spring for normally urging said pawl into contact with said ring, and a lever for moving said pawl out of engagement with said ring and for maintaining said pawl in such disengaged position.

ROBERT H. SHADDOX.

References Cited in the file of this patent

FOREIGN PATENTS

| Number | Country | Date |
|---|---|---|
| 381,299 | Great Britain | Oct. 3, 1932 |